United States Patent
Earthrowl et al.

(10) Patent No.: US 8,057,105 B2
(45) Date of Patent: Nov. 15, 2011

(54) CAGE FOR A ROLLER BEARING AND A ROLLER BEARING

(75) Inventors: Brian Edward Earthrowl, Norfolk (GB); Martin Janek Caspall, Norfolk (GB)

(73) Assignee: Cooper Roller Bearings Company Limited, Norfolk (GB)

( * ) Notice: Subject to any disclaimer, the term of this patent is extended or adjusted under 35 U.S.C. 154(b) by 513 days.

(21) Appl. No.: 12/107,487

(22) Filed: Apr. 22, 2008

(65) Prior Publication Data

US 2008/0260317 A1    Oct. 23, 2008

(30) Foreign Application Priority Data

Apr. 23, 2007  (GB) .................... 0707786.0

(51) Int. Cl.
  *F16C 33/46* (2006.01)
(52) U.S. Cl. .......................... 384/577; 384/573
(58) Field of Classification Search .......... 384/572, 384/573, 576, 577, 580, 570
See application file for complete search history.

(56) References Cited

U.S. PATENT DOCUMENTS

| | | | |
|---|---|---|---|
| 1,019,819 A | 3/1912 | Cavender | |
| 2,253,412 A | 8/1941 | Young | |
| 2,528,987 A * | 11/1950 | Albett | 384/570 |
| 3,166,363 A | 1/1965 | Pitfield | |
| 3,692,374 A | 9/1972 | Scheifele | |
| 4,239,304 A * | 12/1980 | Wakunami | 384/573 |
| 4,397,507 A | 8/1983 | Kraus et al. | |
| 4,475,777 A * | 10/1984 | Hofmann et al. | 384/572 |
| 4,623,270 A * | 11/1986 | Olschewski et al. | 384/576 |
| 4,671,682 A | 6/1987 | Yoshihara | |
| 5,178,474 A | 1/1993 | Muntnich et al. | |
| 5,630,669 A | 5/1997 | Stewart | |
| 6,068,409 A * | 5/2000 | Sakai | 384/580 |
| 6,655,521 B2 | 12/2003 | Ulrich et al. | |
| 7,258,492 B2 * | 8/2007 | Yoon | 384/523 |

FOREIGN PATENT DOCUMENTS

| | | |
|---|---|---|
| EP | 0016880 | 10/1980 |
| GB | 573447 | 12/1943 |
| JP | 2006097798 | 4/2006 |

* cited by examiner

*Primary Examiner* — Thomas R Hannon
(74) *Attorney, Agent, or Firm* — Convergent Law Group LLP (57) ABSTRACT

A cage for use in a roller bearing, said cage comprising a pair of generally semicircular molded plastic parts joined together, the molded plastic parts each comprising a set of pockets for receiving and locating rollers, and releasable fixings at their ends, wherein two generally semicircular molded plastic parts are detachably interconnected to each other by inter-engagement of their respective releasable fixings to form a complete generally circular cage.

11 Claims, 6 Drawing Sheets

CAGE FOR A ROLLER BEARING AND A ROLLER BEARING

CROSS-REFERENCE TO RELATED APPLICATIONS

This application claims benefit of foreign priority under 35 USC 119, to Great Britain Patent Application 0707786.0, filed on Apr. 23, 2007, which is incorporated herein by reference.

TECHNICAL FIELD

The present invention relates to split roller bearings and more particularly to cages and cage components therefore.

BACKGROUND OF THE INVENTION

As is known, a split roller bearing of conventional design employs inner and outer rings between which a series of rollers are held in spaced apart relationship by a cage to locate in raceways formed by the rings. The bearing is made to separate into two halves about a diametric plane and each half of the bearing is then composed of semi-circular inner and outer ring components and a semi-circular cage component. Thus compared with roller bearings which are not of the split type, there is an inherent problem in relation to the strength and stiffness of a two part assembly of two semicircular cage halves when compared with the single piece cage used in non-split roller bearings.

Designers of split roller bearings are aware of this problem and in order to provide the necessary stiffness and strength, conventional cage components for split roller bearings are made from die-cast aluminium or from machined aluminium or gun metal. To fasten the cage components together to form a ring it is conventional to employ separate fastening clips or spring plates which again are of metal to provide the necessary stiffness and strength.

When the split roller bearing is dismantled, the cage halves are separated. In a split roller bearing the cage has an additional function of retaining the rollers when the cage and roller assembly is removed from the bearing.

When the outer race is stationary, the roller train, and hence the cage rotates at about 45% of the speed the inner race. At high speeds the rotational forces on the cage become significant. For cages in solid (non-split) bearings, these forces translate into tensile stress in the cage structure, and because the cage stiffness is constant around its circumference, the cage may increase in diameter but will remain circular. Split bearing cages on the other hand are less stiff at the joints than at right angles to the joints and under high speed rotation will tend to move out at the joints with the cage taking on a form where the circular arcs comprising the cage halves are not tangential at the joints. If the movement at the joints is large enough, the distortion of the cage may impede the rotation of the roller train causing the rollers to skid across the races generating heat and premature failure of the bearing, or the cage may run heavily on one of the races also causing heat generation.

The present invention is provided to reduce or eliminate this disadvantage.

SUMMARY OF THE INVENTION

According to a first aspect, the present invention comprises a cage for use in a roller bearing, said cage comprising a pair of generally semicircular moulded plastic parts joined together, the moulded plastic parts each comprising a set of pockets for receiving and locating rollers; and releasable fixing means at their ends; wherein two generally semicircular moulded plastic parts are detachably interconnected to each other by inter-engagement of their respective releasable fixing means to form a complete generally circular cage.

Preferably each generally semicircular moulded plastic part comprises side wall portions forming the sides of the moulded plastic part; and bars spaced apart along the wall portions and joining the wall portions together, said side wall portions and said bars forming said pockets for receiving and locating the rollers. Preferably the diameter of the cage, when assembled from the pair of generally semicircular moulded plastic parts is less when measured between the interconnections between the pair of generally semicircular moulded plastic parts than at right angles thereto.

Preferably the diameter of the cage, when assembled from the pair of generally semicircular moulded plastic parts is less when measured between the interconnections between the pair of generally semicircular moulded plastic parts (D1) than at right angles thereto (D2) according to the formula $$0.5 > (D2-D1)/D1 > 0.005$$

Preferably the diameter of the cage, when assembled from the pair of generally semicircular moulded plastic parts is less when measured between the interconnections between the pair of generally semicircular moulded plastic parts (D1) than at right angles thereto (D2) according to the formula $$(D2-D1)/D1 = 0.01.$$

Preferably the pockets include surfaces to retain the rollers in the pockets and the pockets are formed and dimensioned such that the rollers may be pressed into the pockets.

Preferably said bars form pocket side walls extending parallel to the axis of the cage and the outer edge of said axially extending walls include relieved portions to provide lips which retain the rollers, said lips having enough flexibility for the rollers to be inserted into their respective pockets.

In this case, the side walls of each pocket may be parallel to one another which allows the roller significant radial movement.

Preferably the cage includes a surface for engaging with a clamping ring in the assembled bearing.

Preferably said releasable fixing means are integral with and are adapted to locate the generally semicircular moulded plastic parts relative to one another in the circumferential direction and in the radial direction, said releasable fixing means comprising, moulded into one end of each semi-circular plastic part, teeth-like projections which include on their outermost edge a tenon, and moulded into the opposite end of each semi-circular plastic part, a slot shaped to engage with the tenon when the two semicircular plastic parts are engaged.

In this case, the engaged releasable fixing means may be provided with slots between the opposite ends of the semi-circular plastic parts which allow a screwdriver to be inserted into the slot to disengage the engaged releasable fixing means.

Preferably said releasable fixing means are integral with and are adapted to locate the generally semicircular moulded plastic parts relative to one another in the circumferential direction and in the radial direction, said releasable fixing means comprises, moulded in the relevant end of one of the semi-circular plastic part, extending male tangs with backward facing surfaces and moulded in the other end of the other semi-circular plastic part, a tooth portion for engaging with the surface the adjacent the semi-circular plastic part, the engagement of the tooth portions with the backward facing surfaces providing the circumferential location.

According to a further aspect, the invention comprises a split roller bearing comprising an inner ring; an outer ring; a cage as claimed in any of claims 1 to 12, said cage loosely mounting a plurality of rollers, the inner and outer rings being spaced and allowed to rotate with respect to one another by the rollers the inner ring and outer rings each being formed of two generally semi-circular parts detachably interconnected to each other.

BRIEF DESCRIPTION OF THE DRAWINGS

Preferred embodiments of the invention will now be described, by way of examples only, with reference to the accompanying drawings wherein:

FIGS. 7 to 9 shows a first embodiment of releasable fixing means wherein FIG. 9 is a perspective view of the opposite half of the cage to that shown in FIG. 8, FIGS. 10 and 11 show a second embodiment of releasable fixing means, wherein

DESCRIPTION OF THE PREFERRED EMBODIMENTS OF THE INVENTION

To reduce the distortion of the cage as it rotates, the inventor has realised that the cage material and the form of the cage halves have to be considered. Since the magnitude of centripetal force is dependent on the mass of the rotating body, the mass of the cage should be reduced as much as possible and so a material with a low density should be selected. However, the critical material parameter is the ratio of the elastic modulus to the density, and, as set out above, it has hitherto been considered that for split roller bearing cages, it is necessary to use die-cast aluminium or machined aluminium or gun metal or similar dense rigid material. From this point of view, with regard to cage distortion, plastics are generally worse than metals. Surprisingly, we have found that by applying the principles of this invention, an engineering plastic that has an upper temperature limit compatible with the operating temperatures of the bearing and is resistant to oils and lubricant additives may be used. In this application, polyamide 4-6 (Stanyl) was selected, but other suitable materials are PES and PEEK (supplied by Vitrex). Polyamide 6-6 can also be used where the requirement to withstand high temperatures is not as great.

Figure 1:
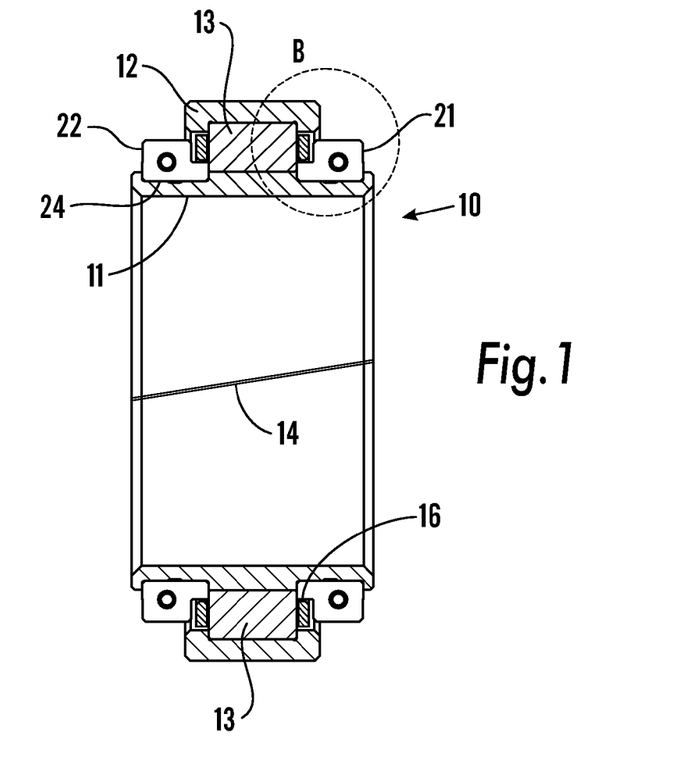
FIG. 1 is an axial section of a roller bearing according to an embodiment of the invention.

FIG. 1 shows a radial cross section of a split roller bearing 10. The split roller bearing 10 comprises an inner ring 11, an outer ring 12, the inner and outer rings being spaced and allowed to rotate with respect to one another by rollers 13. The inner ring 11 may be mounted, for example, to the outer diameter of a shaft, and the outer ring 12 may be mounted, for example, to a static mounting (or a generally static mounting, it may be allowed a certain degree of movement to allow it to align with axis of the shaft).

Figure 2:
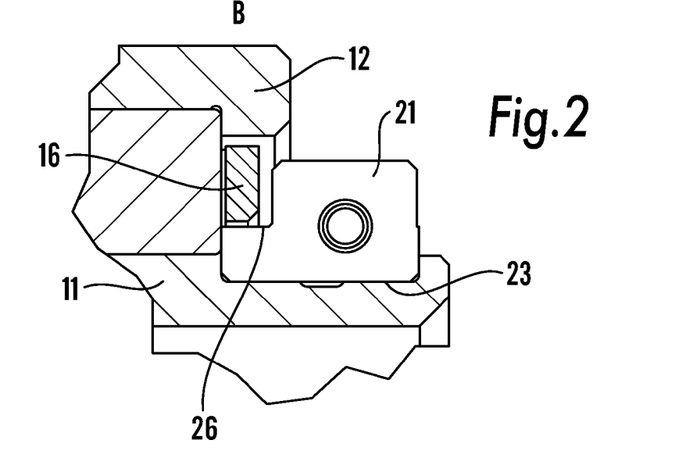
FIG. 2 is an enlargement of part of FIG. 1.

As is clear from FIG. 2, the inner ring 11 and outer ring 12 are each formed as two generally semi-circular halves and the two halves are is separable by means of splits 14, two splits being provided diametrically opposite to one another. It will be noted that the length of the split 14 is at an angle other than zero to the axis of the inner ring 11.

Figure 3:
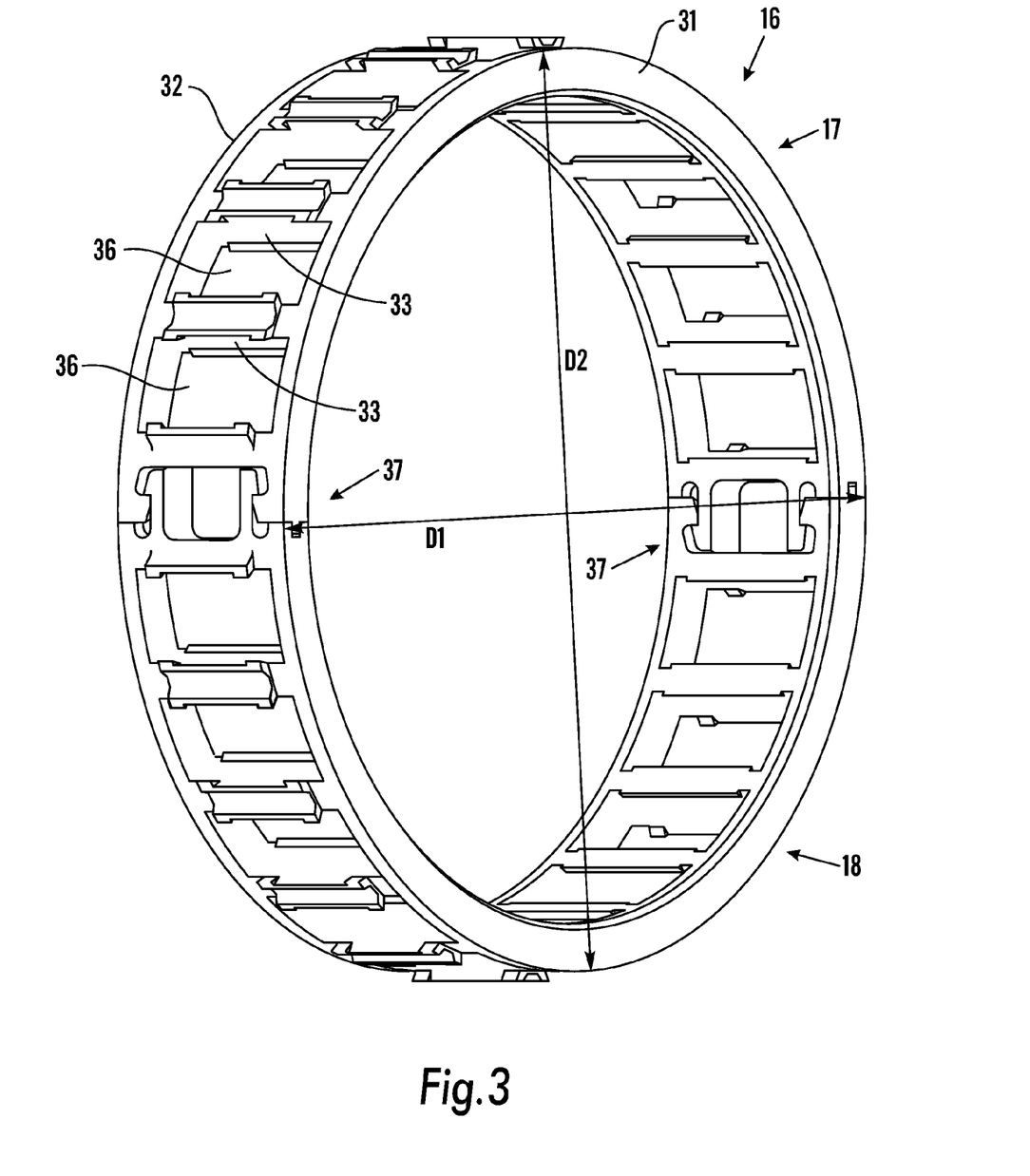
FIG. 3 is a perspective view of a cage for use in the split roller bearing of FIG. 1.

The rollers 13 are loosely mounted in a cage 16 and the cage 16 comprises two generally semi-circular cage halves 17, 18 as shown in FIG. 3. The form of the cage 16 will be described hereafter with reference to FIG. 3 to 11.

Continuing with the arrangement of FIG. 1, it will be seen that the inner ring 11 also mounts two clamping rings 21, 22 in circumferential grooves 23, 24, and once again each clamping rings 21, 22 comprise two semicircular clamping ring halves.

The clamping ring has a radial cross section as is clear from FIG. 2, there being provided an outwardly facing surface 26 which, when the shaft and cage are not rotating, engages the inner circumferential surface of the relevant part of the cage 16. Alternatively, the outward facing surface 26 could be provided by a lip that was integral with the inner race. Referring now to FIG. 3, the cage 16 comprises a pair of generally semicircular moulded plastic halves 17, 18, joined together at their ends, the moulded halves 17, 18 each having two parallel continuous side wall portions 31, 32 which (as seen in FIGS. 1 and 2) overlap the ends of the rollers and form the sides of the moulded plastic halves 17, 18, and bars 33 spaced apart along the continuous wall portions 31, 32 which join the continuous side wall portions 31, 32 together. The adjacent bars 33, and continuous wall parts 31, 32 form a series of pockets 36 in which the rollers 13 may be mounted as will be described later.

The opposite ends 38, 39 of each semicircular cage half 17, 18, are formed with integral releasable fixing means 37 which will be described in detail later with reference to FIGS. 7 to 11.

Figure 4:
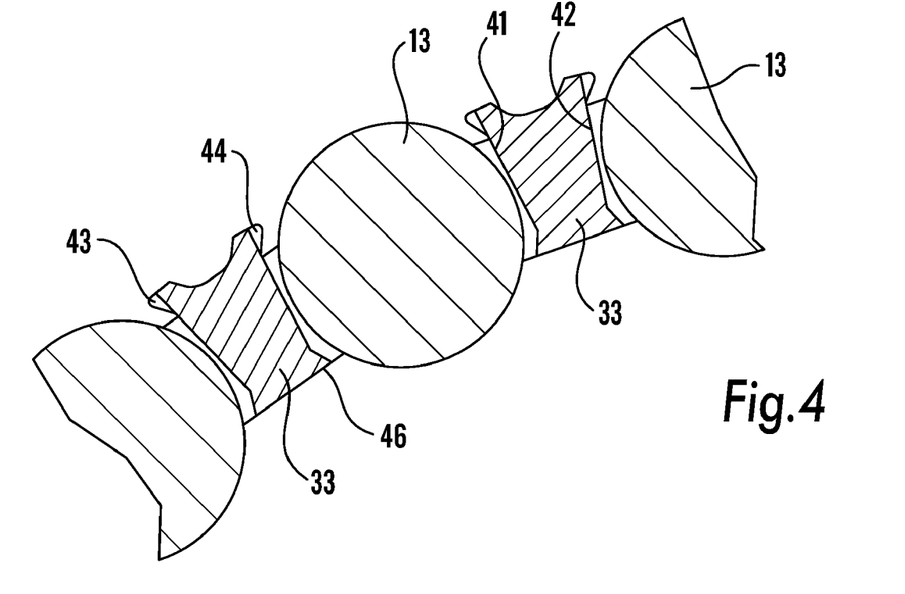
FIG. 4 is a part axial section through the cage of FIG. 3 with rollers inserted.
Figure 5:
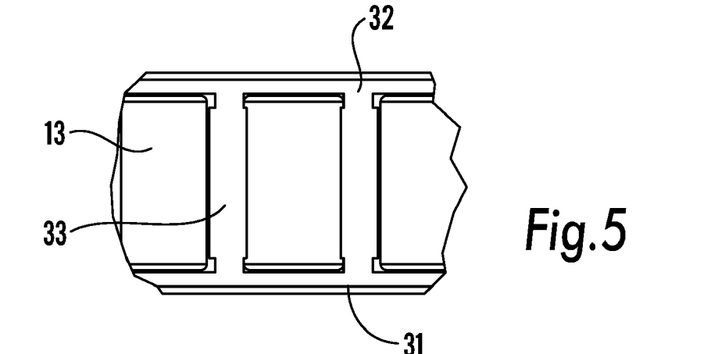
FIG. 5 is a view of the part of the cage shown in FIG. 4 from inside the cage.
Figure 6:
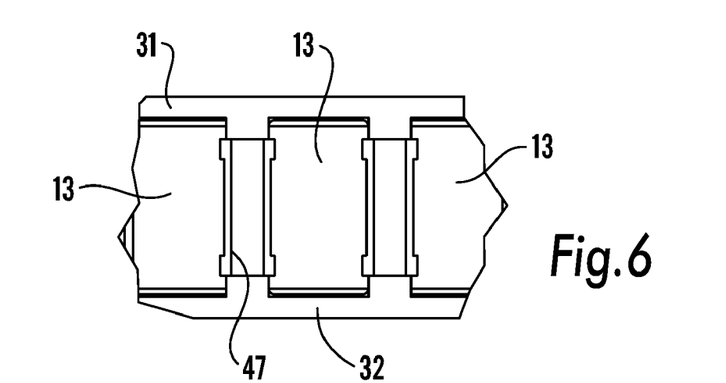
FIG. 6 is a view of the part of the cage of FIG. 4 from outside the cage.

The details of the shapes and cross sections of the pockets 36, and bars 32, 33 will now be described with reference to FIGS. 4 to 6.

As mentioned before, a requirement for the cages in a split bearing is that the rollers are retained in the cage body when the cage halves are removed from a bearing. When designing the cage pocket shape, the ease of assembly of the roller into the cage and reducing the complexity of the mould tool from which the plastic cage is made must be considered. FIGS. 4 to 6 show the detail of the cage pocket. FIG. 4 is a section (at right angles to the axis of the bearing) through a pocket. In the main, the sides 41, 42 of the pockets (which are formed by the sidewalls of the relevant bars 33) are parallel to facilitate the withdrawal of the tool during the moulding operation. The parallel sides 41, 42 of the pocket allow significant radial movement of the cage bars relative to the entrapped roller 13, as may be caused by distortion of the cage or thermal expansion each angled in at the bottom of the pocket 36 to provide a lip 46 which prevents the roller 13 dropping through. At the top of the pocket 36 (i.e. at the outer diameter of the cage) lips 43, 44 prevent the roller 13 from falling outwards. However, as is seen in FIG. 6, the lips do not extend along all of the length of each bar 33, but material has been relieved (at 47, see FIG. 6) between the axial ends of the lips 43, 44 to provide enough flexibility in the lips 43, 44 for the roller 13 to be assembled easily into the pocket 36 of the cage, and allow the mould tool to be withdrawn without over-stressing the cage.

We now return to the matter of the overall shape of the two generally semicircular cage halves 17, 18.

As already described, as the shaft and hence the cage 16 rotates there is a centripetal force acting on the cage which causes the joints between the semicircular cage halves 17, 18 (which are inherently likely to be less stiff than the remainder of the cage) to move apart. To counteract the outward movement of the joints at speed, each semicircular cage half is moulded so that when the cage is assembled and free of the bearing the outer diameter D1 (see FIG. 3) of the cage between the joints is less than the outer diameter D2 at right angles to the line of the joints. The amount of that difference depends on the outer diameter and the section of the cage side wall. For the designs under consideration here, the difference is between about 0.005 and 0.05 mm per mm of outer diameter, preferably about 0.01 mm per mm of outer diameter. The values have been determined by finite element analysis of the cage deflections for various rotation speeds.

Thus, $$0.5 > (D2-D1)/D1 > 0.005$$

Preferably, $$(D2-D1)/D1 = 0.01$$

There is a certain amount of clearance between a roller 13 and the cage pocket 36 that contains it. Under gravity the cage will drop until the cage pocket clearance is taken up and the cage contacts a roller at either top or bottom dead centre (roller riding), or if the clearance is large enough, a race surface (race riding) or some other part of the bearing. In this instance, the cage is supported on machined surfaces on the inner race clamping rings as shown in FIG. 2. It is believed that this arrangement creates less internal friction than a roller riding cage.

Another advantage of the described preferred embodiment of the invention is that because the cage bore diameter is less across the joints than at right angles to them, in our arrangement the cage tends to grip the clamping ring surfaces at low speeds. This has been shown to overcome a problem with cage and roller slip when the bearing is very lightly loaded in the radial direction. In a correctly lubricated bearing under very light radial loads there is insufficient friction between the rollers and raceways to rotate the rollers and drive the cage and roller train round. With the cage gripping the clamping ring surfaces, to an extent, the cage will be driven round by the friction torque between cage and clamping ring. It has been shown that this torque is sufficient to prevent cage slip at low loads yet is low enough to be overcome by the roller rotation as the load increases to more normal levels. It is found that the friction torque between the cage and clamping rings counteracts the forces which tend to prevent rotation of the cage and roller assembly such that cage and roller assembly rotates in the correct ratio to shaft speed at lower radial loads than would be required for other cage and roller designs to assume the correct rotational speed.

Cage halves can be held together with separate spring clips, but there are considerable technical advantages of the injection moulding manufacturing process to mould integral joint clips. The joints must locate the cage halves relative to one another in the circumferential direction and preferably also in the radial direction. FIGS. 7, 8 and 9, and FIGS. 10 and 11 respectively show two representations of integral joint design.

Figure 7:
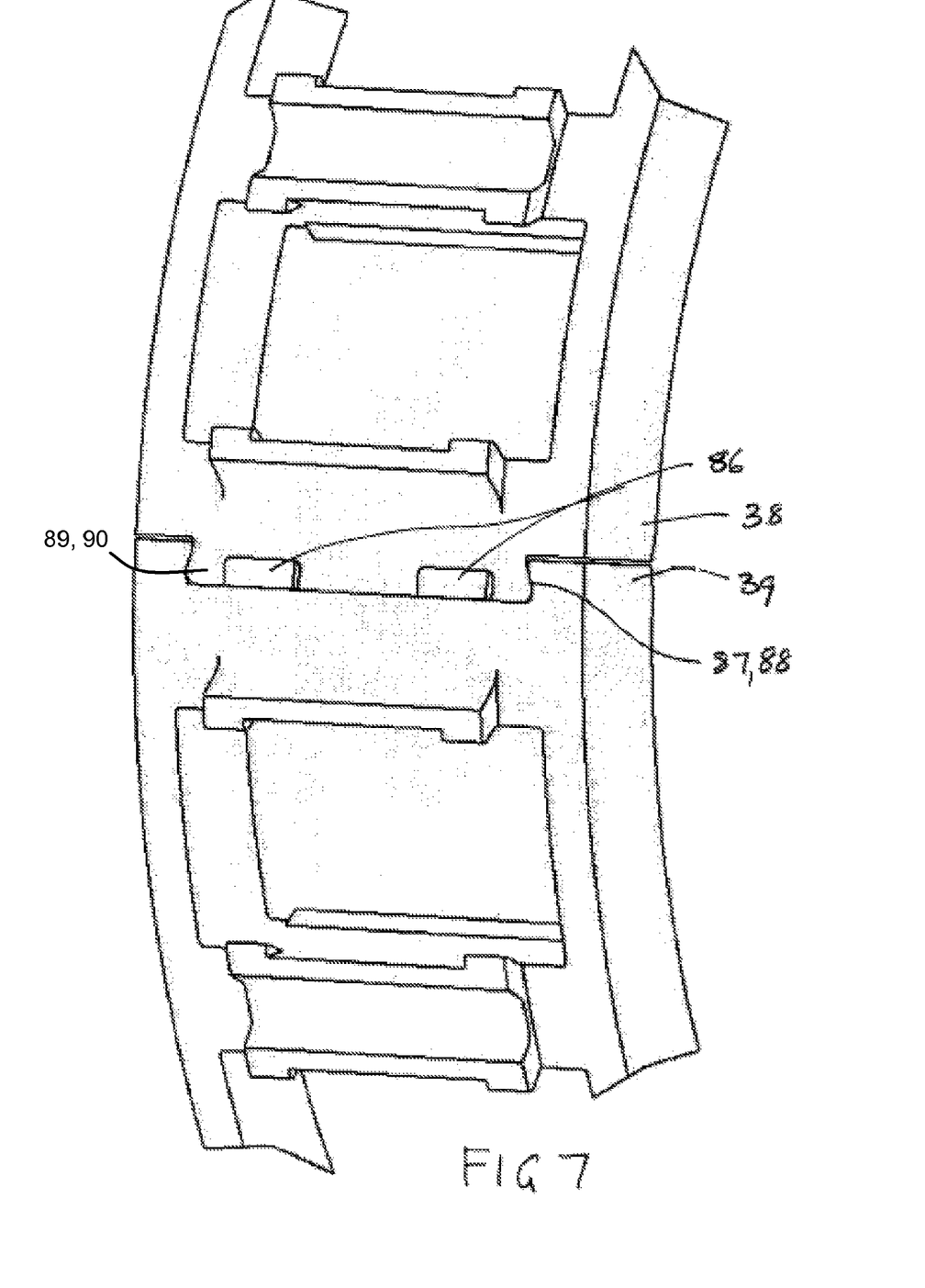
FIG. 7 is a perspective view of a joint assembly between two halves of the cage of FIG. 3, with the two halves assembled.
Figure 8:
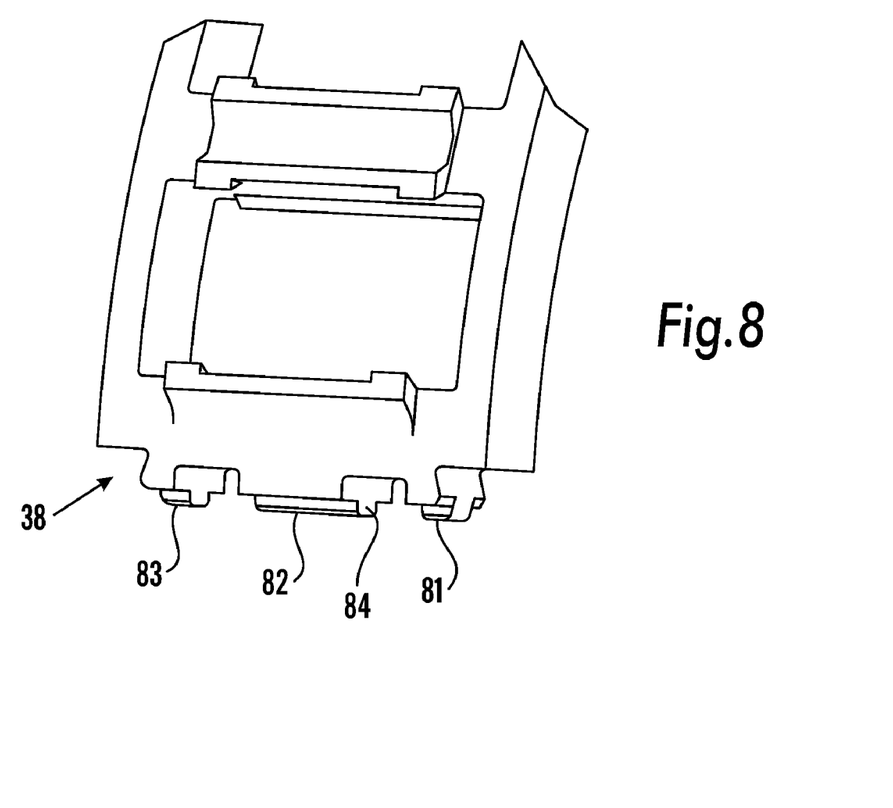
FIG. 8 is a perspective view corresponding to FIG. 7 but of the end of one half of the cage, the other half of the cage having been removed.
Figure 9:
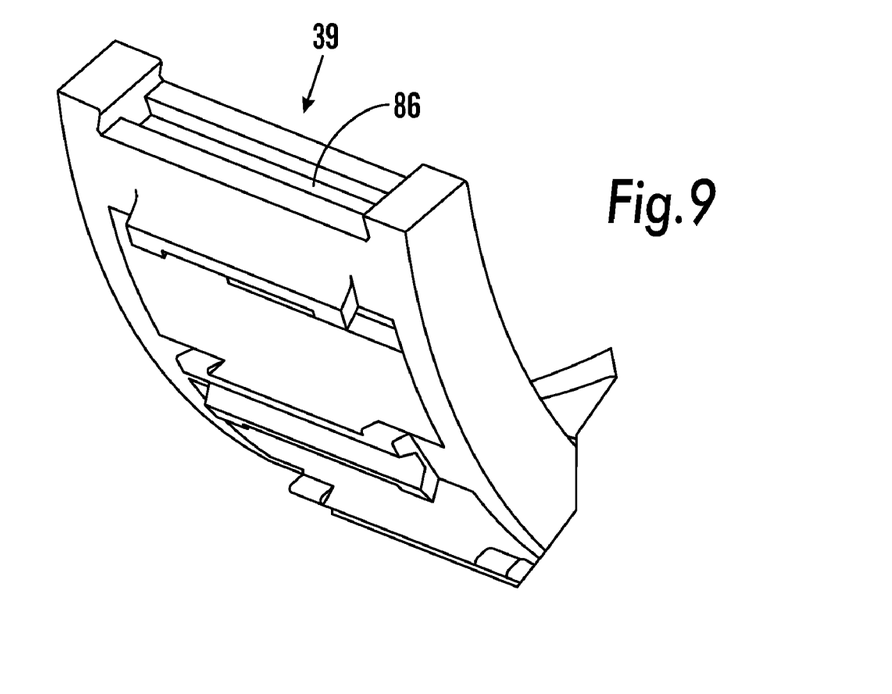

Referring to FIGS. 7 to 9, releasable fixing means 37 comprises, moulded into one end 38 of each semi-circular cage half 17, 18, teeth-like projections 81, 82, 83 which include on their outermost edge a tenon 84 that has a rectangular cross section with round edges to aid engagement into slot 86. The opposite end 39 of each semi-circular cage half 17, 18 shown in FIG. 9, includes a moulded slot 86 shaped to engage with the tenon 84 when the two semicircular cage halves are engaged.

The closed (engaged) releasable fixing means 37 is shown in FIG. 7 and it will be see that there are also provided slots 86 between the opposite ends 38, 39 of these cage halves 17, 18 which allow a screwdriver to be inserted into the slot to disengage the closed releasable fixing means 37.

The teeth-like projections 81, 83 include angled faces at, for example, 87, 88, which engage similar faces 89,90 on the end 39 to provide circumferential location between the two cage halve 17, 18.

It will be understood from a consideration of FIGS. 7, 8 and 9 that the releasable fixing means 37 provides circumferential as well as axial rigid location between the ends 38, 39 of the two cage halves 17, 18 when they are engaged but at the same time, allows ready engagement by a certain limited amount of flexing of the plastics material of the cage halves, and ready disengagement by insertion of a screwdriver into the slots 86.

Figure 10:
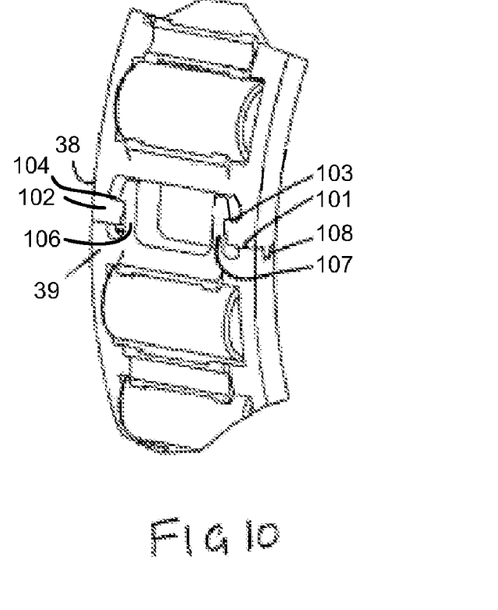
FIG. 10 shows a perspective view of engaged opposite ends of halves of the cage.
Figure 11:
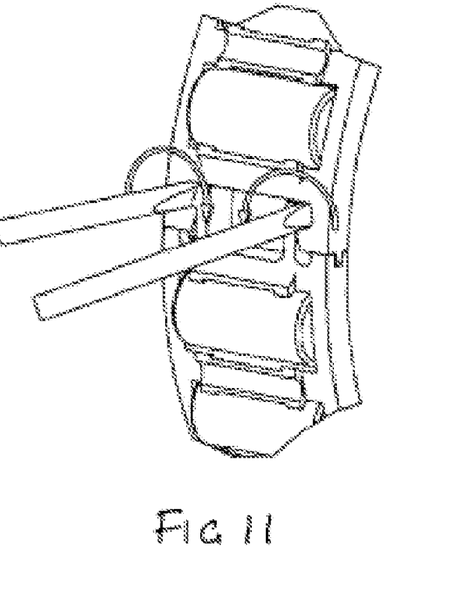
FIG. 11 shows the arrangement of FIG. 10, with rollers inserted in the pockets, and a tool for releasing the releasable fixing means.

We now turn to the alternative releasable fixing means 37 shown in FIGS. 10 and 11. In this case, the relevant end 38 of one 17 of the cage halves 17, 18 includes extending male tangs 101, 102 with backward facing surfaces 103, 104. The end 39 of the other cage half 18 includes a tooth portion 106, 107 for engaging with the surfaces 103, 104 of the adjacent cage half. There are also provided tenon and spigot joints at 108 which provide radial location. The engagement of the tooth portions 106, 107 with the backward facing surfaces 103, 104 provides the circumferential location.

A gap is provided between the male tangs 101 and 102 and the corresponding female part whereby a screwdriver may be inserted to disengage the male tang and the female part as shown in FIG. 11.

Although the arrangement of FIGS. 7 to 9 is more compact, the better engagement of male and female parts in the arrangement of FIGS. 11 and 12 make it more suitable for applications where there is a degree of external vibration.

In summary, we have described a split roller bearing cage, manufactured from a plastic material with suitable mechanical and thermal properties which retains the rollers within the cage halves when the cage and roller assembly is being assembled into or removed from the bearing itself. The cage is moulded such that, when assembled and stationary, the diameter across the joints is smaller than the diameter at right angles to the joints to compensate for deformation at high rotation speeds that may impair the performance of the bearing, thus shortening its life; and to allow the bearing to work at lower radial loading without initiating roller skidding.

The invention is not restricted to the details of the foregoing examples. The split cage could be used in a bearing with solid (not split) races.

What is claimed is:
1. A cage for use in a roller bearing, said cage comprising:
   a pair of generally semicircular moulded plastic parts joined together having releasable fixing means at their ends, the generally semicircular moulded plastic parts each comprising a set of pockets for receiving and locating rollers, said pair of generally semicircular moulded plastic parts being detachably interconnected to each other by inter-engagement of the releasable fixing means to form a complete generally circular cage, and wherein the diameter of the generally circular cage, when assembled from the pair of generally semicircular moulded plastic parts, is less when measured between the interconnections between the pair of generally semicircular moulded plastic parts (D1) than at right angles thereto (D2) according to the formula:

$$0.5 > (D2-D1)/D1 > 0.005.$$

2. The cage according to claim 1 in which each generally semicircular moulded plastic part comprises, side wall portions forming the sides of the moulded plastic part; and bars spaced apart along the wall portions and joining the wall portions together, said side wall portions and said bars forming said pockets for receiving and locating the rollers.

3. The cage according to claim 2, wherein said bars form pocket side walls extending parallel to the axis of the cage and the outer edge of said axially extending walls include relieved portions to provide lips which retain the rollers, said lips having enough flexibility for the rollers to be inserted into their respective pockets.

4. The cage according to claim 3, wherein the side walls of each pocket are parallel to one another which allows the roller significant radial movement.

5. The cage according to claim 1, wherein the diameter of the cage, when assembled from the pair of generally semicircular moulded plastic parts, is less when measured between the interconnections between the pair of generally semicircular moulded plastic parts (D1) than at right angles thereto (D2) according to the formula $$(D2-D1)/D1=0.01.$$

6. The cage according to claim 1, wherein the pockets include surfaces to retain the rollers in the pockets and the pockets are formed and dimensioned such that the rollers may be pressed into the pockets.

7. The cage according to claim 1 wherein said releasable fixing means are integral with and are adapted to locate the generally semicircular moulded plastic parts relative to one another in the circumferential direction and in the radial direction, said releasable fixing means comprising, moulded into one end of each semi-circular plastic part, teeth-like projections which include on their outermost edge a tenon, and moulded into the opposite end of each semi-circular plastic part, a slot shaped to engage with the tenon when the two semicircular plastic parts are engaged.

8. The cage according to claim 7 in which the engaged releasable fixing means are provided with slots between the opposite ends of the semi-circular plastic parts which allow a screwdriver to be inserted into the slot to disengage the engaged releasable fixing means.

9. The cage according to claim 1 wherein said releasable fixing means are integral with and are adapted to locate the generally semicircular moulded plastic parts relative to one another in the circumferential direction and in the radial direction, said releasable fixing means comprises, moulded in the relevant end of one of the semi-circular plastic part, extending male tangs with backward facing surfaces and moulded in the other end of the other semi-circular plastic part, a tooth portion for engaging with the backward facing surface of a male tang of an adjacent semi-circular plastic part, the engagement of the tooth portions with the backward facing surfaces providing the circumferential location.

10. The cage of claim 1, wherein the cage includes a surface for engaging with a clamping ring in the assembled bearing, said cage surface gripping with the clamping ring at low speeds of rotation of the bearing.

11. A cage for use in a roller bearing, said cage comprising:

a pair of generally semicircular moulded plastic parts joined together having releasable fixing means at their ends, the generally semicircular moulded plastic parts each comprising a set of pockets for receiving and locating rollers, said pair of generally semicircular moulded plastic parts being detachably interconnected to each other by inter-engagement of the releasable fixing means to form a complete generally circular cage, the diameter of the generally circular cage, when assembled from the pair of generally semicircular moulded plastic parts, is less when measured between the interconnections between the pair of generally semicircular moulded plastic parts (D1) than at right angles thereto (D2) according to the formula:

$$0.5 > (D2-D1)/D1 > 0.005, \text{ and}$$

wherein the cage includes a surface for engaging with a clamping ring in the assembled bearing, said cage surface gripping with the clamping ring at low speeds of rotation of the bearing.

* * * * *